Aug. 25, 1953 S. KEILIEN ET AL 2,649,870
FAULT DETECTING POWER-DRIVEN SCREW DRIVER
Filed Jan. 19, 1952 2 Sheets-Sheet 2

INVENTORS
SAUL KEILIEN
JOSEPH DISCENZA
BY
Leech & Radue
ATTORNEYS

Patented Aug. 25, 1953

2,649,870

UNITED STATES PATENT OFFICE 2,649,870

FAULT DETECTING POWER-DRIVEN SCREW DRIVER

Saul Keilien and Joseph Discenza, Syracuse, N. Y., assignors to Pass & Seymour, Inc., Syracuse, N. Y., a corporation of New York Application January 19, 1952, Serial No. 267,229

9 Claims. (Cl. 144—32)

This invention relates to a power screw-driver, and more particularly to a power screw-driver equipped to detect faults, failures and omissions in its operation.

It is a general object of the present invention to provide a novel and improved automatic power driven screw-driver fitted to automatically inspect the completeness of the screw-driving operation effected thereby.

More particularly it is an object of the invention to provide, in a power driven screw-driver, mechanism to change the operation of the work piece feed to indicate faults in the screw-driving operation.

An important object of the invention comprises the arrangement, in a power driven screw-driver having a torque responsive blade, of means actuated by changes in speed of the blade to effect a selective operation of the feed mechanism for the work piece whereby faulty screw-driving is automatically detected.

One of the important features of the invention resides in the use of a centrifugal switch driven by the screw-driver blade for the control of the work retracting mechanism.

Another important feature of the invention consists in the arrangement of the work feed mechanism for a power driven screw driver whereby the work piece is automatically advanced to the screw feeding and driving device as the result of positioning it on the work platform, together with means under the joint control of the platform position and screw-driver speed for retaining the work platform in the work advanced position or withdrawing it in accordance with the degree of perfection of the screw inserting operation.

Other and further objects and features of the invention will be more apparent to those skilled in the art upon a consideration of the accompanying drawings and following specification wherein is disclosed a single exemplary embodiment of the invention, with the understanding that such changes and modifications may be made therein as fall within the scope of the appended claims without departing from the spirit of the invention.

Figure 1:
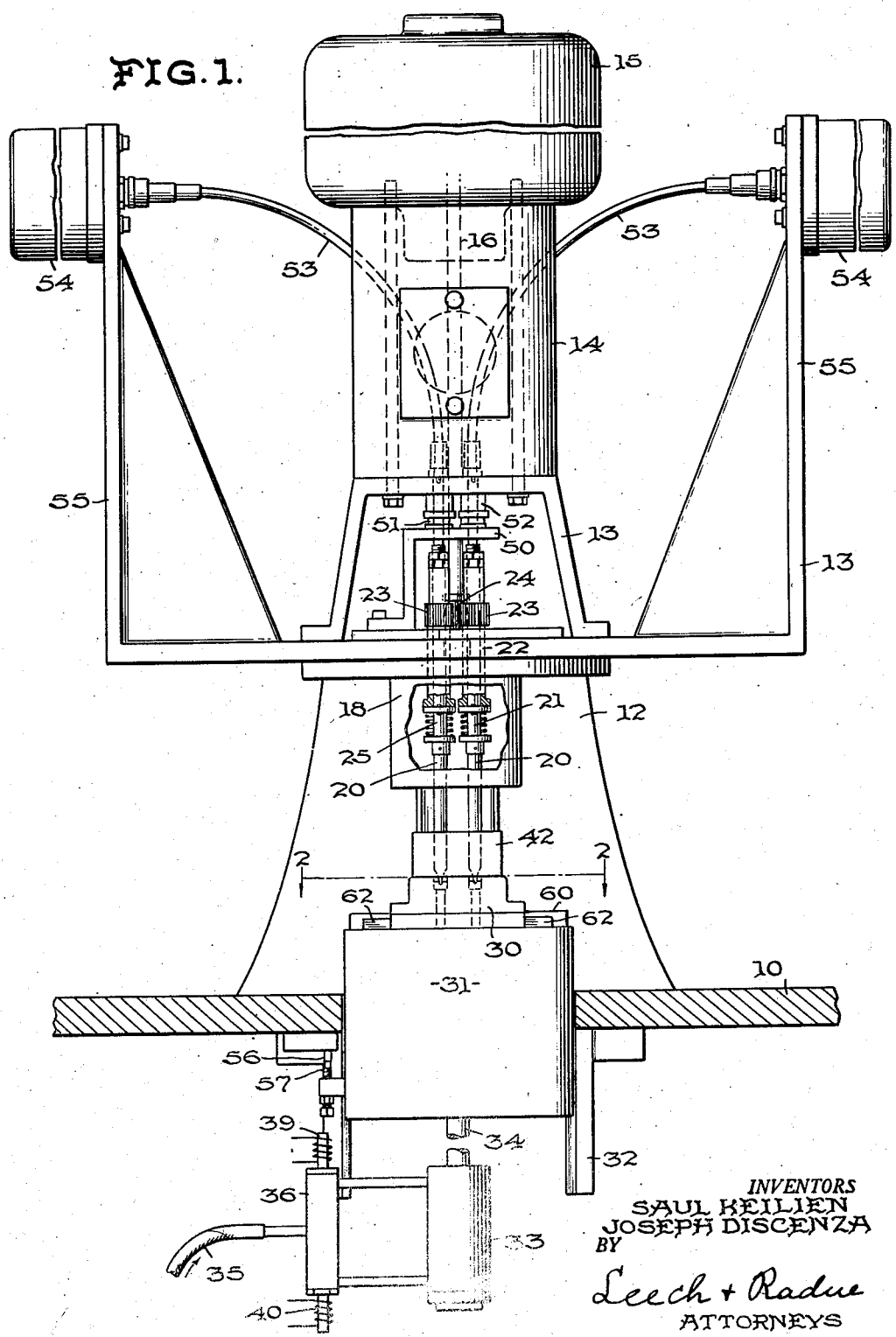
Fig. 1 is a front elevation of a double screw-driving machine equipped with fault detecting apparatus in accordance with the present invention.

In many operations on small work pieces screws are used to hold parts in assembled relationship. These are usually driven by some form of power screw-driver comprising a power source, a driver blade and some sort of torque responsive clutch mechanism which allows the blade to slow up or stop as the load increases or the screw is driven home, without seriously changing the speed of the motor. The operator, by watching the rotation of the blade, determines when the screw is fully set and withdraws the work. In many operations self tapping screws are used and they often are driven into preformed holes in molded plastic parts. Because of several faults which may occur prior to or during the fastening operation the parts must usually be passed by an inspector to determine if the fastenings are suitably set up to provide the desired security. For instance, the screws, which are usually fed automatically, may be lacking in threads, may be too short, or may not be properly kerfed to receive the driver. These and other faults occur occasionally even in screws purchased from the best of manufacturers. In connection with the actual operation of driving the plastic may be split or the threads formed therein may be stripped by the driving operation, so that the screw does not hold in the desired manner.

The present device has been developed to eliminate the requirement for inspection of the work after removal from the machine, and in that sense may be said to be a self-inspecting screw-driver, sensitive to whatever be the fault of the screw, if it is either not driven at all, is driven only part way, or is fully driven but does not hold.

In accordance with the present invention fully driven but not holding screws resulting from no threads, stripped threads or broken plastic are detected by speed responsive switches indicating that the screw-driver speed does not slow up at a time when the screw should be bottomed. Failure to insert the screw for the full distance is detected by mechanism which prevents the return of the work piece carriage at the end of the driving opration because it has not made the full stroke.

In the operation of the machine the operator places the work piece on a platform, and in so doing engages it with switch mechanism initiating the feed stroke. Relative movement between the work holding platform and screw-driver is then effected and the screw, which is fed automatically, is engaged by the screw-driver and pushed from its spring fingers into the proper opening in the parts to be assembled. If the work table reaches its full stroke a switch is closed to initiate the retracting operation, but this switch being in series with a centrifugal switch will not effect the retraction unless the latter switch is closed, which happens only when its speed is substantially lowered. It is driven by the screw-driver blade but only closes the circuit when the blade slows down or stops as the result of proper fastening of the screw. Failure of the work holding platform to lower is an indication to the operator that the work piece must be rejected and a manual switch is provided for effecting the lowering.

For a full understanding of the invention reference should be had to the accompanying drawings wherein is shown a double screw-driver illustrative of apparatus used for assembling the two parts of an attachment plug receptacle, at least one of the parts being formed of molded plastic and receiving self-tapping screws.

Fig. 1 illustrates the screw-driving machine as a whole. It is intended to be mounted for use in conjunction with a table 10 on which work parts are stored for manual assembly before insertion into the machine. The machine is supported from a column 12 on which is mounted a suitable weldment 13 of reinforced U-shape. Its lower element supports a smaller inverted U-shaped piece 13 carrying the hollow cylindrical column 14 surmounted by the drive motor 15 having a vertical shaft 16 running down through the column and terminating in a bearing in the lower member of the weldment 13. Additional bearings in this part and in the housing 18 secured beneath the same support the screw-driver shanks 20, each of which is fitted with a slipping torque clutch 21 including a drive sleeve 22 to the upper end of which is attached a pinion 23. The pinions 23 are spaced apart and are engaged by a gear 24 on the motor shaft 16 whereby they are driven in the same direction. The torque clutches, which are conventional in power screw-drivers, permit the drivers themselves to be slowed up or stopped by increased resistance of the screws being driven while the motor continues to rotate without damage to itself.

Relative movement between the work piece and the screw-drivers may be achieved by moving the latter or the former and for simplicity the work piece illustrated at 30 is adapted to be manually positioned on a movable platform 31 vertically reciprocable in guides 32 which may be attached to the column of the machine beneath the table 10. In its normal or work receiving position the top surface of the platform is substantially flush with the table 10 for convenience in loading.

The platform 31 is moved between the down or loading position and the upper position, illustrated in Fig. 1, by means of a pneumatic cylinder 33 having a piston connected to the platform by rod 34. Air from pipe 35 passes to a conventional three-way valve 36 which selectively admits air to the upper or lower end of cylinder 33 and exhausts the air from the opposite end. Suitable stops, not shown, may limit the upper and lower movement of the platform. The valve 36 has armatures attached to its two ends which reciprocate through solenoids 39 and 40, which when separately energized move the valve into a position for "up" or "down" motion of the platform. The valve remains in the set position until the opposite solenoid is actuated.

The lower ends of the screw-drivers intended to engage the screw kerfs are shown passing through openings in the screw chute assembly 42, which forms no part of the present invention, but serves to feed screws from a magazine into position, between spring fingers, to be engaged by the drivers and for their lower ends to be received in the clearing holes in the upper part of the work piece as it is lifted.

The upper ends of the screw-driver shanks 20 project up beyond the drive gears 23 on the sleeves and are journaled in an inverted L-shaped support 50 above which they are fitted with coupling members 51, receiving the coupling sockets 52 forming the ends of flexible drive shafts 53, one for each screw-driver. These flexible shafts lead to the speed actuated switches 54, shown as mounted on the vertical side members 55 of the weldment. These switches, which are commercially available, are preferably of the centrifugal type, arranged to be open when driven above a predetermined speed and to close below this predetermined speed. The critical speed is set just slightly below the normal load operating speed of the screw-drivers so that if they are slowed up or stopped by resistance of the screws the switches close but if the drivers continue to rotate at full speed the switches remain open. The slowing of a screw-driver indicates an increased load and the stopping thereof generally indicates that the screw has been drawn home, under which conditions it is desired to remove the work piece. Screws continuing to rotate with the drivers moving at substantially full speed indicate the absence of threads on the screws or the stripping of the material into which they are driven.

If the screws are too long or are stopped in their normal driving operation before being driven home, then the work holding platform is not permitted to reach its top limit so that it will not close the switch 56 mounted beneath the work table by engaging it with the adjustable screw 57 carried in a projection from the lower portion of the platform.

Figure 2:
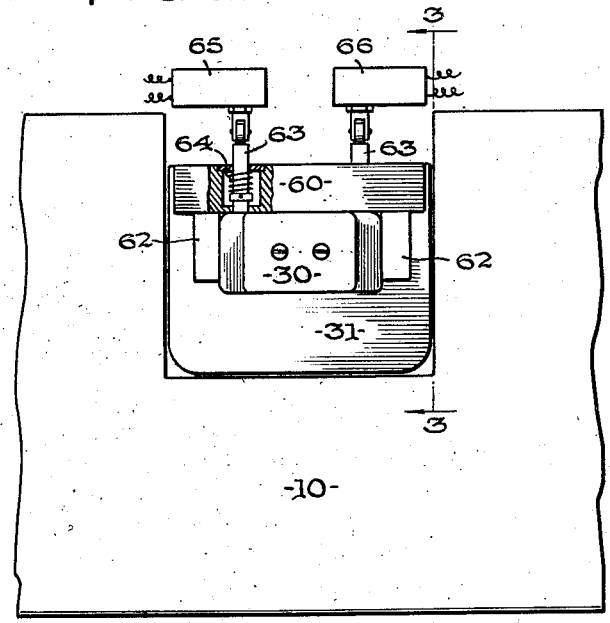
Fig. 2 is a top plan view of the movable work platform and the switches actuated by the work piece thereon.
Figure 3:
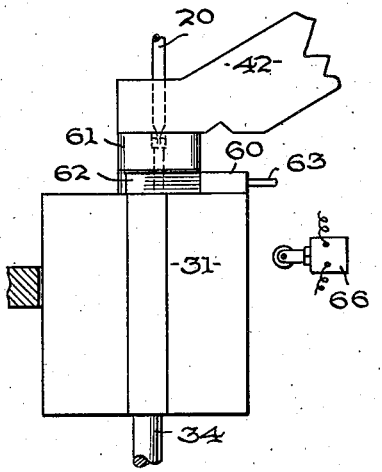
Fig. 3 is a side elevation thereof.

Referring now to Figs. 2 and 3, it will be seen that the work supporting platform 31 is provided along its rear edge with a work stopping rail 60 against which the operator presses the work piece when loading the machine. Preferably end guides 62 are also provided to locate the work properly in respect to the screw-drivers above. This rear stop rail 60 is fitted with a pair of sliding pins 63 extending rearwardly therethrough. The forward ends of these pins normally project beyond the front face of the rail 60 to be engaged by the work piece and pressed back to the position illustrated in Fig. 2, against the action of their housed return springs 64. Positioned immediately behind the pins 63 are a pair of normally open circuit "microswitches" 65 and 66 requiring but small motion to close their circuits. Thus when the piece is positioned on the platform and pressed back against the rail the switches 65 and 66 are closed, but immediately the work starts to be lifted the pins 63 are moved away from the actuating rollers of the switches and they open under the action of their springs. Latch means may be provided on the platform to hold the work piece against the rail.

Figure 4:
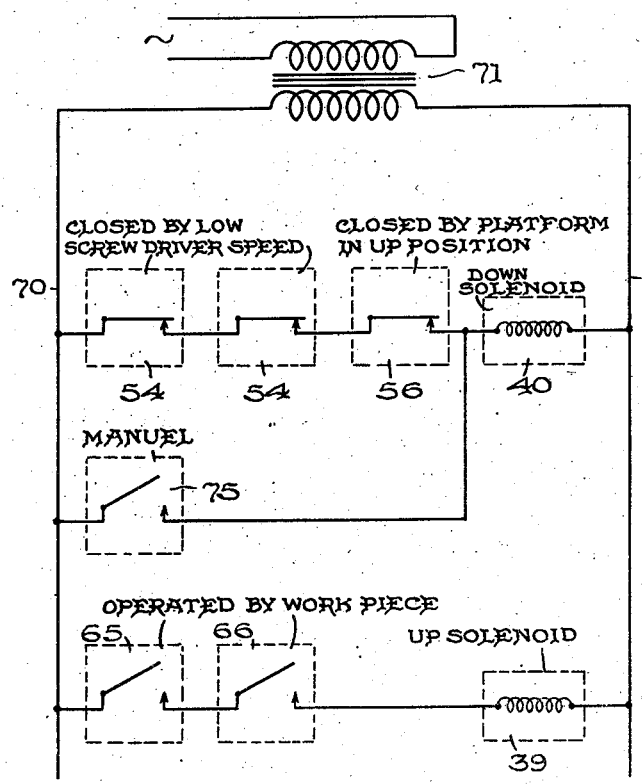
Fig. 4 is a wiring diagram of the detecting and operating circuits.

The wiring diagram of Fig. 4 shows the manner of operating the fault detecting and machine operating circuits. The main circuit conductors 70 are energized from the secondary of transformer 71, the primary of which receives power from an A. C. line. The "up" and "down" solenoids 39 and 40 are shown connected each in a circuit with a plurality of switches. The two switches in series with the "up" solenoid are those numbered 65 and 66 and adapted to be actuated by the positioning of the work piece on the movable platform. It will be seen that when these switches are both actuated, indicating a proper positioning of the work piece on the platform, the "up" solenoid will be energized and the platform will start to move. The motor is running and the screws have been positioned beneath the drivers so that as the work continues to rise the screws pass through the clearance holes in the upper section of the work piece and enter the smaller holes in the lower section where they are driven and tightened if the operation goes well. While the screws are being threaded into the lower portion of the work piece the drivers do not slow up sufficiently to close the circuits at the switches 54.

The "down" solenoid 40, which serves to lower the platform after the work operation is completed so that the operator may remove the part and substitute a new one, is only energized by the closing of switch 56 when the work table reaches its full up stroke and by the closing of both screw-driver actuated switches 54, indicating that both screw-drivers have come to a stop with the screws fully driven. Failure of the platform to reach the top results in no closing of the switch 56 so that the "down" solenoid cannot be energized. This indicates a screw not fully driven even though the drivers may have stopped rotating. If the work platform reaches its maximum "up" position but one of the switches 54 is not closed because of stripped threads or the like the platform will not be lowered. In any event, any failure to completely close the circuit to the "down" solenoid immediately indicates to the operator that the work on the piece is not completed and the piece should be rejected. He then manually closes the switch 75 which shunts switches 54, 54 and 56 and energizes solenoid 40 which lowers the table to permit the incomplete piece to be rejected. The manual switch is a momentary contact type and cannot be held closed. The machine is now ready to receive another work piece which initiates the cycle just described. Thus the operation of the mechanism constitutes a self-inspection of the work and eliminates the need for a separate inspection operation.

We claim:

1. In a power driven screw-driver in combination, a motor, a screw-driver blade, mechanism connecting the motor and blade whereby the blade slows or stops on overload, a work holding platform, means to effect relative feed and retract movement between the driver and platform, a feed initiating circuit for said means including a normally open switch, means engageable by a work piece on the platform to close said switch, a retract initiating circuit including a pair of series connected normally open switches, means actuated by the feed mechanism to close one of the series connected switches near the end of the feed stroke, the second series connected switch being responsive to driver speed, open at normal speed and closed at speeds substantially below normal whereby the retract movement is effected following the feed stroke only if the driver slows or stops.

2. The power driven screw-driver of claim 1 in which a manually operable, normally open switch shunts said pair of series-connected switches.

3. In a power driven screw-driver in combination, a motor, a screw-driver blade, mechanism connecting the motor and blade whereby the blade slows or stops on overload, a work holding platform, means to effect relative feed and retract movement between the driver and platform, a feed initiating circuit for said means including a normally open switch, means engageable by a work piece on the platform to close said switch, a retract initiating circuit including a normally open switch and means to close said switch actuated in unison with the feed means and only at the end of substantially the full feed stroke whereby the retract operation is effected only if a screw is fully driven into the work piece.

4. In a power screw-driver apparatus, in combination, a motor driven screw-driver blade having a torque responsible clutch, a switch responsive to the speed of rotation of said blade, normally open above a critical speed less than working speed and closed at less than critical speed, a work receiving platform beneath the said blade, pneumatic means to effect relative feed and retract motions between the blade and platform, a two position valve for said pneumatic means, a solenoid for actuating the valve to retract position, a normally open switch positioned to be closed by said feed motion at the end thereof, a source of power, said switches and said solenoid being connected in series whereby the retract motion is only effected if full feed stroke and screw driver slow down occur.

5. The apparatus of claim 4 in which a second motor driven screw-driver blade is provided for operation simultaneously with the first, a similar speed responsive switch driven thereby, means to feed a screw into position to be driven into the work by each driver, the switch of the second driver being connected in said series whereby both drivers must slow up before the retract operation takes place.

6. In a power screw-driver apparatus, in combination, a motor driven screw-driver blade having a torque responsive clutch, a switch responsive to the speed of rotation of said blade, normally open above a critical speed less than working speed and closed at less than critical speed, a work receiving platform beneath the said blade, means to effect relative feed and retract motions between the blade and platform, magazine type screw delivery mechanism, a circuit to initiate feed movement of said means, a switch in said circuit, means to close said switch by the positioning of a work piece on said platform, and circuit means including said speed responsive switch to designate work pieces with improperly driven screws.

7. The apparatus of claim 6 in which a third switch is provided adapted to be closed as the result of a full length feed stroke, said third switch being connected in series with the speed responsive switch whereby both said last mentioned switches are in control of designating work pieces with improperly driven screws.

8. In a power screw driving machine, in combination, a screw-driver blade, power means for rotating the blade, a clutch between said power means and screw-driver adapted to slip when the torque exceeds a predetermined value, a switch responsive to the speed of rotation of said blade and normally in one circuit controlling condition above a critical speed less than working speed and in the opposite condition below said critical speed, a circuit controlled by said switch and means in said circuit to indicate improperly driven screws.

9. The machine defined in claim 8 in which means is provided to effect relative motion between the blade and a work piece as a screw is driven into the latter, and means included in said circuit to indicate incomplete driving of a screw.

SAUL KEILIEN.
JOSEPH DISCENZA.

References Cited in the file of this patent

UNITED STATES PATENTS

| Number | Name | Date |
| --- | --- | --- |
| 2,235,374 | Kellogg | Mar. 18, 1941 |
| 2,322,024 | Hutchinson | June 15, 1943 |
| 2,518,049 | Mosier | Aug. 8, 1950 |
| 2,534,140 | Moore | Dec. 12, 1950 |